United States Patent
Tsirkin (10) Patent No.: US 11,025,621 B2
(45) Date of Patent: Jun. 1, 2021

(54) ENHANCING PRIVACY OF NETWORK CONNECTIONS

(71) Applicant: Red Hat, Inc., Raleigh, NC (US)

(72) Inventor: Michael Tsirkin, Vokneam Yillit (IL)

(73) Assignee: Red Hat, Inc., Raleigh, NC (US)

( * ) Notice: Subject to any disclaimer, the term of this patent is extended or adjusted under 35 U.S.C. 154(b) by 918 days.

(21) Appl. No.: 15/442,439

(22) Filed: Feb. 24, 2017

(65) Prior Publication Data
US 2018/0248871 A1    Aug. 30, 2018

(51) Int. Cl.
| H04L 29/06 | (2006.01) |
| H04W 12/06 | (2009.01) |
| H04L 29/12 | (2006.01) |
| H04W 12/02 | (2009.01) |
| H04W 48/18 | (2009.01) |
| H04W 48/12 | (2009.01) |

(52) U.S. Cl.
CPC ...... H04L 63/0876 (2013.01); H04L 61/6022 (2013.01); H04L 63/0421 (2013.01); H04W 12/02 (2013.01); H04W 12/06 (2013.01); H04W 48/12 (2013.01); H04W 48/18 (2013.01)

(58) Field of Classification Search
CPC .... H04L 63/0876; H04W 12/06; H04W 12/02
USPC .......................................................... 726/4
See application file for complete search history.

(56) References Cited

U.S. PATENT DOCUMENTS

| 7,185,204 B2 | 2/2007 | Narayanaswami et al. |
| 7,231,660 B1 * | 6/2007 | Daude ................. H04L 61/2015 709/220 |
| 8,510,858 B2 | 8/2013 | Lee |

(Continued)

FOREIGN PATENT DOCUMENTS

| CN | 101616495 | 12/2009 |
| CN | 101867650 | 10/2010 |

(Continued)

OTHER PUBLICATIONS https://content.safervpn.com/blog/how-to-create-virtual-wifi/, The Ultimate Guide to Creating a Virtual WiFi, Mar. 13, 2015, 8 pages.

*Primary Examiner* — Malcolm Cribbs
*Assistant Examiner* — Angela R Holmes
(74) *Attorney, Agent, or Firm* — Lowenstein Sandler LLP (57) ABSTRACT

An example method may include detecting, by an operating system component of a computing device, that a client requesting a network connection is operating in a non-persistent mode that prevents tracking of network locations accessed by the client; in response to the detecting, performing privacy enhancing operations before establishing the network connection for the client. The privacy enhancing operations include: broadcasting network messages to discover networks without using previously stored information related to the networks; receiving network identifying information from the networks; providing the network identifying information for the networks to the client; requesting the client to perform media access control (MAC) address randomization; receiving a random MAC address and authentication information for a connection to a network selected from the networks; and authenticating the client; and causing the network connection to be established upon a successful authentication of the client.

20 Claims, 5 Drawing Sheets

(56) References Cited

U.S. PATENT DOCUMENTS

| | | |
|---|---|---|
| 9,369,874 B2 | 6/2016 | Otiato et al. |
| 2006/0114863 A1* | 6/2006 | Sanzgiri ............ H04W 12/1202 370/338 |
| 2006/0236384 A1* | 10/2006 | Lindholm ............. H04L 63/083 726/10 |
| 2006/0253586 A1 | 11/2006 | Woods |
| 2008/0165738 A1* | 7/2008 | Barber ................. H04W 48/18 370/331 |
| 2014/0362293 A1 | 12/2014 | Bakar et al. |
| 2014/0366156 A1 | 12/2014 | Liu |
| 2016/0029218 A1* | 1/2016 | Otiato ................. H04W 12/08 726/3 |
| 2017/0064554 A1* | 3/2017 | Li ........................ H04L 63/101 |

FOREIGN PATENT DOCUMENTS

| | | |
|---|---|---|
| CN | 103795847 | 5/2014 |
| CN | 104618382 | 5/2015 |
| CN | 102902914 | 6/2015 |
| WO | WO2016109816 | 7/2017 |

* cited by examiner

ENHANCING PRIVACY OF NETWORK CONNECTIONS

TECHNICAL FIELD

The present disclosure is generally related to networking, and is more specifically related to enhancing privacy of network connections on network devices.

BACKGROUND

Computing devices may include operating systems that manage hardware and software resources of the computing devices. For example, operating systems may operate network devices to cause the network devices to broadcast network messages and receive responses from available networks within range. The responses may contain service set identifiers (SSIDs) that are stored in persistent memory. Further, the operating system may provide the SSIDs to clients (e.g., applications, services, devices, etc.). A user may select one of the SSIDs with which to connect the client, and the operating system may establish a connection between the client and the selected network. In some instances, trace information (e.g., MAC address of the client, address of the networks, SSIDs of the networks, connection passwords, geographical location information of the client and/or the networks, etc.) related to both the client and the networks (e.g., SSIDs) is stored in the persistent memory to facilitate automatically establishing connections, among other things. However, the trace information may be used in ways that cause privacy concerns to some users of the computing devices.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Maintaining one's privacy in the technology world is a concern for many users of computing devices (e.g., laptop, tablet, smartphone, etc.). For example, some high-level computing privacy issues may include the sharing of personal information on a social media network to third parties or website visitation tracking on an Internet browser. A lower-level computing privacy issue may include the information that is available in a system log or a network manager of a computing device. The information stored in the system log and/or network manager may include the addresses of networks that are found when network (e.g., wireless) connectivity is enabled on a network device (e.g., network interface controller (NIC)) of the computing device, geographical location information of the networks and/or client, and/or credentials to connect to the networks, among other things.

Other trace information of the network connection may be stored on the computing devices or at the network providers may include the media access control (MAC) address of a client (e.g., application, service, device, etc.) seeking a connection, access point names of the networks (e.g., service set identifiers (SSIDs)), timestamps of connections, and so forth. Such information may be stored in persistent memory of the computing devices or network providers to expedite the connection establishment process in the future, for example.

An interested party that has access to this information on the computing device or at the network provider may track the user's physical whereabouts by correlating the MAC address of the client and the SSID of a network to which the client connected. Also, the interested party may be able to determine the timeframe that the client, and thus the user, was at the particular physical location using the network connection information on the computing device or at the network provider. This may present a privacy concern for some users. Further, the users may not be capable of remedying the issue because users may not have permission to access the computing devices and/or systems of the network providers.

Aspects of the present disclosure address the above and other deficiencies by enhancing privacy of network connections on computing devices. In particular, aspects of the present disclosure perform privacy enhancing operations, via an operating system component operating a network device of a computing device, in response to detecting that a client requesting a connection to a network is operating in a non-persistent mode to protect the privacy of information related to the client. The client may be a client (e.g., an application or service) of the operating system, a client (e.g., a separate device) of the computing device, or the like. In an example, detecting that the client requesting a connection to a network is operating in the non-persistent mode may cause the network device to broadcast network messages to discover available networks without using previously stored information (e.g., SSIDs) related to the one or more available networks. In some examples, if a known SSID is found by the operating system component, automatic connection to the known SSID is not initiated. In another example, if the user attempts a manual connection to the SSID, a prompt may be displayed via the client to request that the non-persistent mode be deactivated.

If the user selects to connect to the found SSID that is already stored in the persistent memory of the computing device, the operating system component may request that the client perform MAC address randomization. In response, the client may generate a random MAC address and send the random MAC address, along with authentication information (e.g., connection password and/or username), to the operating system component. The operating system component may authenticate the random MAC address and credentials for the selected network and establish a connection between the client and the selected network. Further, in an example, any network connection related information (e.g., random MAC address, discovered SSIDs, network addresses, credentials, geographical information of the client and/or the networks, timestamps of connections, etc.) obtained by the computing device after detection of the client operating in the non-persistent mode may be stored by the computing device in a non-persistent memory of the computing device.

Benefits of the disclosed technology may include protecting the privacy of client information on computing devices and/or systems of network providers by using anonymizing techniques and/or not storing information related to the network connections in persistent memory of the computing device. Various aspects of the above referenced methods and systems are described in details herein below by way of examples, rather than by way of limitation.

Figure 1:
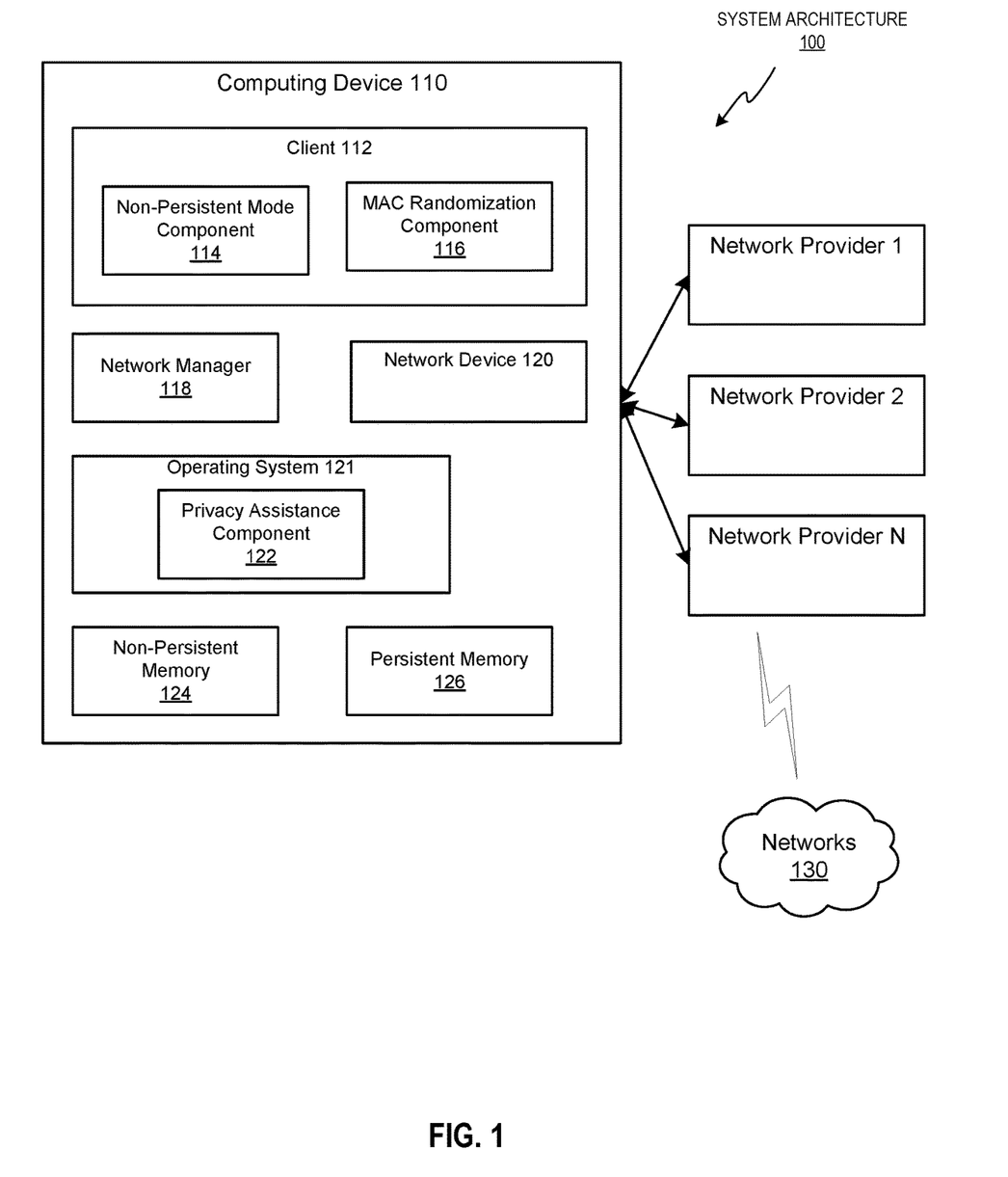
FIG. 1 depicts a high-level diagram of an example system architecture operating, in accordance with one or more aspects of the present disclosure.

FIG. 1 depicts a high-level diagram of an example system architecture 100 operating in accordance with one or more aspects of the present disclosure. It should be noted that other architectures are possible, and that the implementation of a system utilizing embodiments of the disclosure are not necessarily limited to the specific architecture depicted. The system architecture 100 may include a computing device 110 and one or more network providers 1, 2, and N providing one or more networks 130. The computing device 110 may be communicatively coupled, either wired or wirelessly, to the network providers 1, 2, and N.

The computing device 110 may include any suitable computing device, such as a laptop, tablet, smartphone, personal digital assistant (PDA), desktop, server, router, wireless access point, repeater, hub, switch, bridge, gateway, modem, or other portable or non-portable device. The computing device 110 may interact with other computing devices by exchanging messages via one or more communication protocols.

The network providers 1, 2, and/or N may include telecommunication companies, data carriers, wireless communication providers, Internet service providers, and/or cable television providers offering Internet access. Further, the networks 130 may be provided by the network providers 1, 2, and N and may be a public network (e.g., the Internet), a private network (e.g., a local area network (LAN), a wide area network (WAN)), or a combination thereof. Networks 130 may include a wireless infrastructure, such as a wireless fidelity (WiFi) hotspot (e.g., provided by network device 120) connected with the networks 130 and/or a wireless carrier system that can be implemented using various data processing equipment, communication towers, etc. In some embodiments, the networks 130 may include a wired infrastructure accessed via Ethernet connection via the computing device 110 that enables direct access to the networks 130 provided by the network providers 1, 2, and N.

The computing device 110 may include a client 112 that includes a non-persistent mode component 114 and a media access control (MAC) randomization component 116. In an example, the computing device 110 may function to relay data between the client 112 and the networks 130 provided by the network providers 1, 2, and N. For example, the computing device 110 may be a router that forwards data packets between nodes in one or more of the networks 130 provided by the network providers 1, 2, and N until the data packet reaches a destination node.

The computing device 110 may also include a network manager 118, a network device 120, an operating system 121, a non-persistent memory 124, a persistent memory 126, and one or more processing devices communicatively coupled to memory devices (e.g., persistent memory 126, non-persistent memory 14) and input/output (I/O) devices. The operating system 121 may refer to software that is executed by one or more processing devices of the computing device 110 to control operation of hardware and software resources of the computing device 110. The operating system 121 may include a privacy assistance component 122 that performs some of the privacy enhancing operations described herein. The privacy assistance component 122 may refer to a computer program included as a component of the operating system 121 executing on the computing device 110. As such, the privacy assistance component 122 may be implemented as computer instructions stored on one or more machine-readable storage mediums and executed by one or more processing devices of the computing device 121.

The non-persistent memories 124 may include any suitable type of volatile memory, such as random-access memory (RAM), dynamic random-access memory (DRAM), static random-access memory (SRAM), and the like. The persistent memories 126 may include any suitable type of non-volatile memory, such as hard disk drive, read-only memory (ROM), optical disc drive, magnetic tape, flash memory, solid-state storage, and the like.

In an example, the client 112 may be any suitable application (e.g., computer program) or service executing on the computing device 110 that interacts with the operating system 121. In another example, the client 112 may be a separate application or service executing on another computing device that interfaces with the computing device 110. In another example, the client 112 may be a separate device that is communicatively coupled to the computing device 110.

The non-persistent mode component 114 and the MAC randomization component 116 of the client 112 may refer to computer programs included as standalone applications or services of the client 112 or as components of other computer programs or services executing via the client 112. As such, the non-persistent mode component 112 and the MAC randomization component 116 may be implemented as computer instructions stored on one or more machine-readable storage mediums and executed by one or more processing devices of the computing device 110.

The network manager 118 may refer to a component (e.g., a computer program or module) that may be an independent application or module running on top of the operating system 121, or may be included with operating system 121 or the client 112 of the computing device 110. The network manager 118 may provide a high-level interface for controlling the network device 120 (e.g., a network interface controller (NIC)). For example, device drivers for the network device 120 may be part of the operating system kernel of the computing device 110 and the network manager 118 may be used to configure addresses and other characteristics of the network device 120 by using the device drivers. The network device 120 may include circuitry that enables communicating using a specific physical layer and data link layer standard such as Ethernet, Fibre Channel, WiFi, and the like. Thus, the network device 120 enables the computing device 110 to communicate over the networks 130 (e.g., wired or wirelessly).

At a high level, the non-persistent mode component 114 ensures that information revealing a network connection is not stored in the persistent memory 126 of the computing device 110. Such technology may prevent tracking the physical locations and times that the client 112 accessed any networks 130 if an interested party obtains access to the computing device 110.

Additionally, at a high level, the privacy assistance component 122 performs privacy enhancing operations (e.g., network and/or client anonymizing operations, preventing information revealing network connections between the client 112 and networks 130 from being stored in persistent memory 126, etc.), as described in detail below. Such technology may prevent using previously persisted connections to enhance the privacy of the client.

To illustrate, the non-persistent mode component 114 may receive a selection to activate a non-persistent mode for the client 112 on the computing device 110. In an example, the selection may be received as input from a user interface of the client 112 or the network manager 118. In another example, the selection may be received from another application executing on the computing device 110 in response to the other application entering its own non-persistent mode. A persistent mode refers to storing information obtained during processing in the persistent memory 126. A non-persistent mode refers to not storing information obtained during processing in the persistent memory 126. For example, the non-persistent mode for the client 112 may include storing information obtained by the client 112 from the network manager 118 during network connection activity in the non-persistent memory 124 or not storing the information in any memory.

In some examples, the user may select whether to store information revealing a network connection in the non-persistent memory 124 or to not store the information in any memory of the computing device 110. The information revealing a network connection may include a list of available networks (e.g., SSIDs), addresses of the networks, connection password and/or username, timestamps of network connection attempt, establishment, and/or disconnect, geographical information of the client 112, the computing device 110, and/or the available networks 130, and the like. Further, the selection may be received prior to network connectivity being enabled, prior to the network manager 118 searching for available networks 130, prior to the user selecting an available network 130 with which to connect, or the like.

Based on the selection to activate the non-persistent mode for the client 112, the non-persistent mode component 114 may activate the non-persistent mode. If the user selected to not store the information revealing a network connection in any memory, then a processing device of the computing device 110 may delete the information immediately. If the user selected to store the information revealing a network connection in the non-persistent memory 124, then the information revealing the network connection may be stored until a certain event occurs, such as rebooting the computing device 110, authentication of the client 112 completing, locking the operating system 121, switching users of the operating system 121, logging off the user from the operating system 121, or the like. Upon the event occurring, the information revealing the network connection may be erased from the non-persistent memory 124.

Once the non-persistent mode is activated, the user may instruct the client 112 to request a connection to a network 130. The client 112 may transmit a network message to the privacy assistance component 122 that indicates that the client 112 is operating in the non-persistent mode and that the client 112 is requesting a connection to a network 130. A processing device executing the privacy assistance component 122 may detect, based on the network message, that the client 112 is operating in the non-persistent mode that prevents tracking of network locations accessed by the client 112.

In response to detecting that the client 112 requesting a network connection is operating in the non-persistent mode, the processing device executing the privacy assistance component 122 may perform one or more privacy enhancing operations before establishing the connection between the client 112 and a network 130. The privacy enhancing operations may include broadcasting to find SSIDs of available networks and requesting the client 112 perform MAC address randomization, among other things. Broadcasting network messages to discover available networks 130 may include not using any SSIDs for networks 130 stored in the persistent memory 126. Additionally, even when an SSID is discovered that is previously stored in the persistent memory 126 and associated with a stored MAC address for the client 112, automatic connection to the known SSID and MAC address may not be initiated. In some instances, when a manual connection is requested by the user, a prompt by the client 112 may request that the user deactivate the non-persistent mode.

When the saved connection (e.g., SSID and MAC address) is still attempted, the privacy assistance component 122 may request the client 112 to randomize its MAC address by using the MAC randomization component 116. In some instances, the request from the privacy assistance component 122 may override a saved configuration that previously disabled MAC address randomization. The MAC randomization component 116 may be implemented as computer instructions stored on one or more machine-readable media and executed by one or more processing devices of the computing device 110. The MAC randomization component 116 may perform MAC address randomization to generate random MAC addresses using any suitable scheme, such as using a result of a cryptographic hash function with inputs of the SSID of the selected network 130, the actual MAC address of the client 112, a connection identifier, and/or a random number. Upon generation of the random MAC address, the client 112 may transmit the random MAC address and authentication information for a selected network 130 to the privacy assistance component 122.

The processing device of the computing device 110 executing the privacy assistance component 122 may receive the randomized MAC address and authentication information and authenticate the client 112. The privacy assistance component 122 may cause a connection between the client 112 and the selected network to be established upon a successful authentication of the client 112. In an example, after detecting that the client 112 requesting a network connection is operating in the non-persistent mode, the privacy assistance component 122 may not store any information (e.g., the discovered SSIDs, the random MAC address, the authentication information, timestamps of connections, etc.) obtained during network related events in the persistent memory 126. Instead, the processing device of the computing device 110 may store the information in the non-persistent memory 124 or may not store the information in any memory. The information stored in the non-persistent memory 124 may be erased when a certain event occurs, such as the client 112 deactivating the non-persistent mode, rebooting of the computing device 110, locking of the operating system 121, logging off a user session of the operating system 121, switching users of the operating system 121, or the like. Thus, using the presently disclosed technology, the privacy of a user may be protected by using network and client anonymizing techniques and ensuring that information revealing the network connection is not stored in the persistent memory 126.

Figure 2:
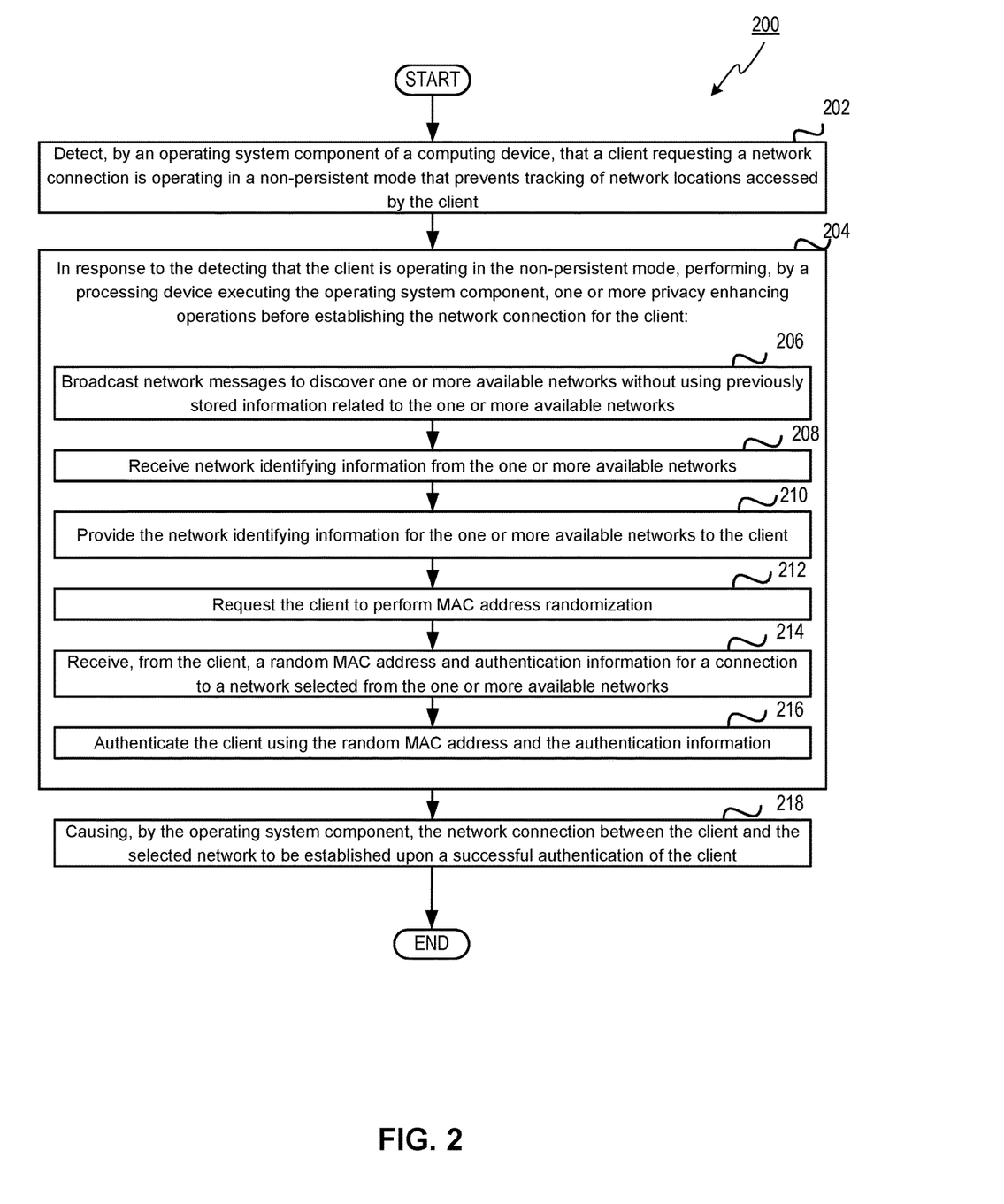
FIG. 2 depicts a flow diagram of an example method for performing privacy enhancing operations, via an operating system component, in response to detecting that a client requesting access to a network is operating in a non-persistent mode, in accordance with one or more aspects of the present disclosure.

FIG. 2 depicts a flow diagram of an example method 200 for performing privacy enhancing operations, via the privacy assistance component 122, in response to detecting that the client 112 requesting access to a network 130 is operating in a non-persistent mode, in accordance with one or more aspects of the present disclosure. Method 200 and each of its individual functions, routines, subroutines, or operations may be performed by one or more processing devices of the computer device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by privacy assistance component 122 executed by one or more processing devices of the computing device 120.

Method 200 may begin at block 202. At block 202, a processing device executing a privacy assistance component 122 of the operating system 121 may detect that a client 112 requesting a connection to a network 130 is operating in a non-persistent mode that prevents tracking of network locations accessed by the client 112. The processing device may perform the detecting by extracting information from a network message or signal transmitted by the client 112. For example, the network message or signal may include information that indicates that the client 112 is requesting a network connection and is operating in the non-persistent mode.

At block 204, in response to detecting that the client 112 is operating in the non-persistent mode, the processing device of the computing device 110 may perform one or more privacy enhancing operations before establishing a network connection for the client 112. In some examples, information (e.g., discovered SSIDs, random MAC address, authentication information, timestamp information, geographical information, etc.) related to the client 112 and/or the networks 130 obtained by performing the one or more privacy enhancing operations may be stored in the non-persistent memory 124 or may not be stored in any memory. As depicted, and as described in further detail below, the one or more privacy enhancing operations may include operations performed in blocks 206, 208, 210, 212, 214, and 216.

The privacy enhancing operations may refer to operations performed by the processing device executing the privacy assistance component 122 that enhance the privacy of the client 112 by performing anonymizing techniques and/or not storing information obtained during network connection activity in the persistent memory 126. In some examples, the privacy enhancing operations may include storing the information obtained during network connection activity in the non-persistent memory 124 or not storing the information in any memory.

For example, one of the privacy enhancing operations may be performed at block 206. At block 206, the processing device may broadcast network messages to discover one or more available networks 130 (e.g., access points) without using previously stored information related to the one or more available networks 130. In some instances, stored SSIDs for previously discovered networks may be stored in the persistent memory 126. Further, when a connection is established between a client 112 and the network 130, the MAC address of the client 112 is stored in the persistent memory 126 and the MAC address, along with authentication information, may be associated with the SSID with which the client 112 connects. Instead of using the SSIDs stored in the persistent memory 126, the processing device (e.g., using the network device 120) broadcasts network messages and receives (block 208) network identifying information (e.g., SSIDs) from one or more available networks 130. The network identifying information may be sent by the available networks 130 in response to the network messages broadcast by the network device 120. In an example, even when an SSID is discovered via broadcasting that is already stored in the persistent memory 126, automatic connection to the known SSID with the MAC address for the client 112 is disabled while the client 112 is operating in the non-persistent mode.

At block 210, the processing device may provide the network identifying information for the one or more available networks to the client 112. If the client 112 is operating in the non-persistent mode, then the client 112 may store the network identifying information in the non-persistent memory 124. At block 212, the processing device may request the client 112 to perform MAC address randomization. In response to the request, the processing device may execute the MAC randomization component 116 to generate a random MAC address. Further, the client 112 may use the network identifying information to display a list of available networks 130 via a user interface of the computing device 110. The user may select one of the available networks 130 for connection and enter authentication information (e.g., username and/or connection password) for the selected network. In response to the network selection and authentication information entry, the client 112 may transmit a message including the random MAC address and/or the authentication information to the privacy assistance component 122.

At block 214, the processing device may receive the random MAC address and the authentication information for a connection to a network selected from the one or more available networks 130. Since the MAC address is random, the privacy assistance component 122 may not be in possession of any information identifying the client 112. At block 216, the processing device may authenticate the client 112 using the random MAC address and the authentication information for the network selected from the network identifying information obtained via broadcasting. Upon successful authentication of the client 112, the processing device may establish a connection between the client 112 and the selected network 130 at block 218.

Figure 3:
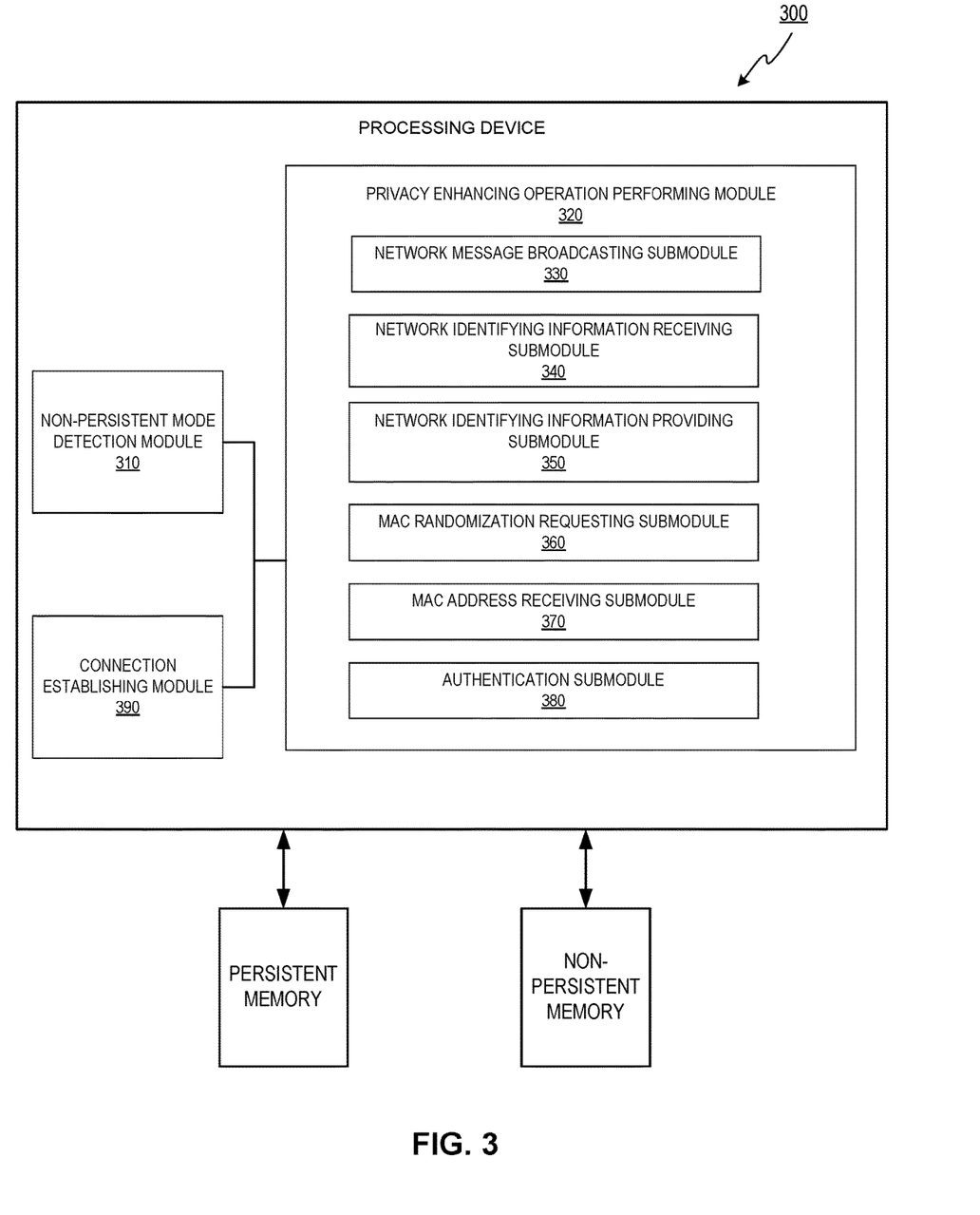
FIG. 3 depicts a block diagram of an example computer system, in accordance with one or more aspects of the present disclosure.

FIG. 3 depicts a block diagram of an example computer system 300 in accordance with one or more aspects of the present disclosure. Computer system 300 may be the same or similar to the computing device 110 and may include one or more processing devices and one or more memory devices. In the example shown, computer system 300 may include non-persistent mode detection module 310, privacy enhancing operation performing module 320, and connection establishing module 390. Privacy enhancing operation performing module 320 may include various submodules, such as network message broadcasting submodule 330, network identifying information receiving submodule 340, network identifying information providing submodule 350, MAC randomization requesting submodule 360, MAC address receiving submodule 370, and authentication submodule 380.

Non-persistent mode detection module 310 may detect that a client 112 requesting a connection to a network 130 is operating in a non-persistent mode that prevents tracking of network locations accessed by the client 112. The detection may be performed by extracting information indicating that the client 112 is requesting a network connection and is operating in the non-persistent mode from a network message or signal transmitted by the client 112.

Privacy enhancing operation performing module 320 may, in response to detecting that the client 112 is operating in the non-persistent mode, perform one or more privacy enhancing operations before establishing the connection between the network connection for the client 112. In an example, the information (e.g., discovered SSIDs, random MAC address, authentication information, geographical information, network addresses, network connection timestamp information, etc.) obtained by performing the privacy enhancing operations may be stored in the non-persistent memory 124 or may not be stored in any memory while the client 112 is operating in the non-persistent mode.

Network message broadcasting submodule 330 may broadcast network messages to discover one or more available networks 130 without using previously stored information (e.g., SSIDs) related to the one or more available networks. In an example, even when an SSID is found that is already stored in the persistent memory 126, automatic connection to the SSID with an associated MAC address is not initiated. If the user attempts a manual connection to the discovered SSID that is already stored in the persistent memory 126, the processing device may request the client 112 to deactivate the non-persistent mode.

Network identifying information receiving submodule 340 may receive network identifying information (e.g., SSIDs, network addresses, geographical information, etc.) from the one or more available networks that respond to the broadcasted network messages. Network identifying information providing submodule 350 may provide the network identifying information for the one or more available networks 130 to the client 112. In some examples, when the client 112 is operating in the non-persistent mode, the client 112 may store the network identifying information in the non-persistent memory 124 or may not store the network identifying information in any memory.

MAC randomization requesting submodule 360 may request that the client 112 perform MAC address randomization. In an example, if the user tries again to connect the client 112 to a discovered SSID that is already stored in the persistent memory 126 and associated with the MAC address of the client 112, the processing device may request the client 112 perform MAC address randomization. Performing MAC address randomization may ensure that the client 112 remains anonymous when establishing a network connection for the client 112 with a discovered SSID that is already known to be associated with the actual MAC address of the client 112.

MAC address receiving submodule 370 may receive, from the client 112, a random MAC address and authentication information for a connection to a network 130 selected from the one or more available networks 130. The authentication information may include a username and/or connection password for a selected network. Authentication submodule 380 may include authenticating the client 112 using the random MAC address and the authentication information.

Connection establishing module 390 may include establishing a connection between the client 112 and the selected network upon a successful authentication of the client 112. Once the connection is established, the client 112 may communicate data over the network 130. Further, in an example, if the connection is lost, the information stored in the non-persistent memory 124 may be used to attempt to reestablish the connection.

Figure 4:
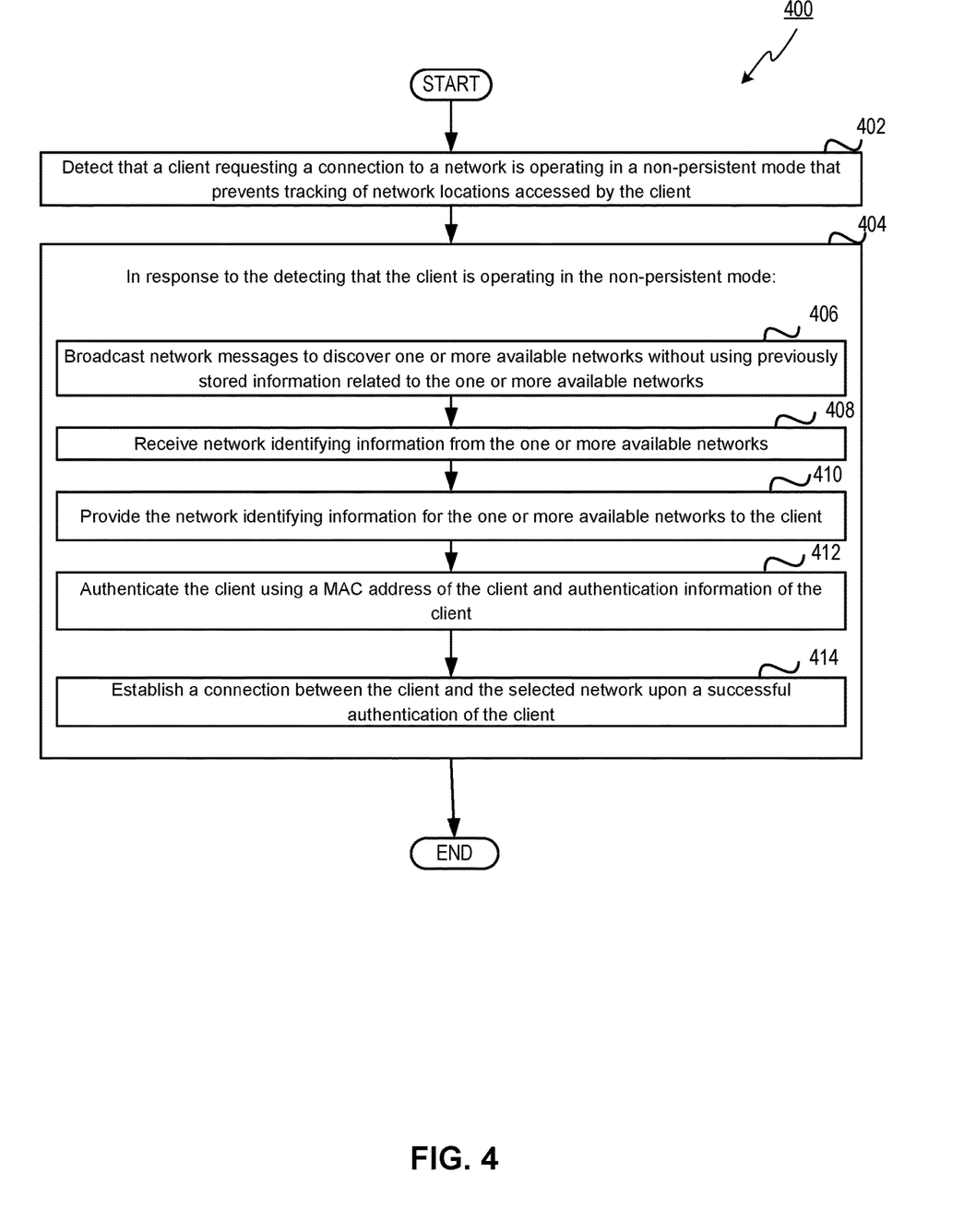
FIG. 4 depicts a flow diagram of another example method for performing privacy enhancing operations in response to detecting that a client requesting access to a network is operating in a non-persistent mode, in accordance with one or more aspects of the present disclosure.

FIG. 4 depicts a flow diagram of another example method 400 for performing privacy enhancing operations in response to detecting that the client 112 requesting a network connection is operating in a non-persistent mode, in accordance with one or more aspects of the present disclosure. Method 400 may be similar to method 200 and may be performed in the same or a similar manner as described above in regards to method 200. For example, method 400 may be implemented as the privacy assistance component 122. Method 400 may be performed by processing devices of the computing device 110 and may begin at block 402.

At block 402, a processing device may detect that a client 112 requesting a connection to a network 130 is operating in a non-persistent mode that prevents tracking of network locations accessed by the client 112. As discussed above, the processing device may extract information sent in a network message or signal from the client 112 that indicates that the client 112 is requesting connection to a network 130 and is operating in a non-persistent mode.

At block 404, in response to the detecting that the client 112 is operating in the non-persistent mode, the processing device may execute operations included in blocks 406, 408, 410, 412, and 414. For example, at block 406, the processing device may broadcast network messages to discover one or more available networks 130 without using previously stored information related to the one or more available networks 130. At block 408, the processing device may receive network identifying information (e.g., discovered SSIDs, network addresses, network geographical information, etc.) from the one or more available networks 130.

At block 410, the processing device may provide the network identifying information for the one or more available networks 130 to the client 112. As discussed above, while the client 112 is operating in the non-persistent mode, the client 112 may store the network identifying information in the non-persistent memory 124 or may not store the network identifying information in any memory based on a selection of the user.

At block 412, the processing device may authenticate the client 112 using a MAC address of the client 112 and the authentication information of the client 112. In an example, the MAC address may be the actual MAC address of the client 112. In another example, the MAC address of the client 112 may be a random MAC address generated by the MAC randomization component 116 of the client 112. The MAC randomization component 116 may generate the random MAC address in response to a request from the privacy assistance component 122 when a user attempts a connection to an SSID already stored in the persistent memory 126. The authentication information may include a username and/or a connection password for the selected network 130.

At block 414, the processing device may establish a network connection between the client 112 and the selected network 130 upon a successful authentication of the client 112. In an example, the processing device may ensure that the network identifying information, the MAC address, and the authentication information are not stored in the persistent memory 126. In an example, the network identifying information, the MAC address, and the authentication information may be stored in the non-persistent memory 124. This information may be erased when a certain event occurs, such as the client 112 deactivating the non-persistent mode. In such an instance, the client 112 may transmit a network message or signal indicating that the non-persistent mode has been deactivated to the privacy assistance component 122. Other example events that cause the network connection related information in the non-persistent memory 124 to be erased may include rebooting of the computing device 110, locking of the operating system 121, logging off a user session of the operating system 121, and the like.

Figure 5:
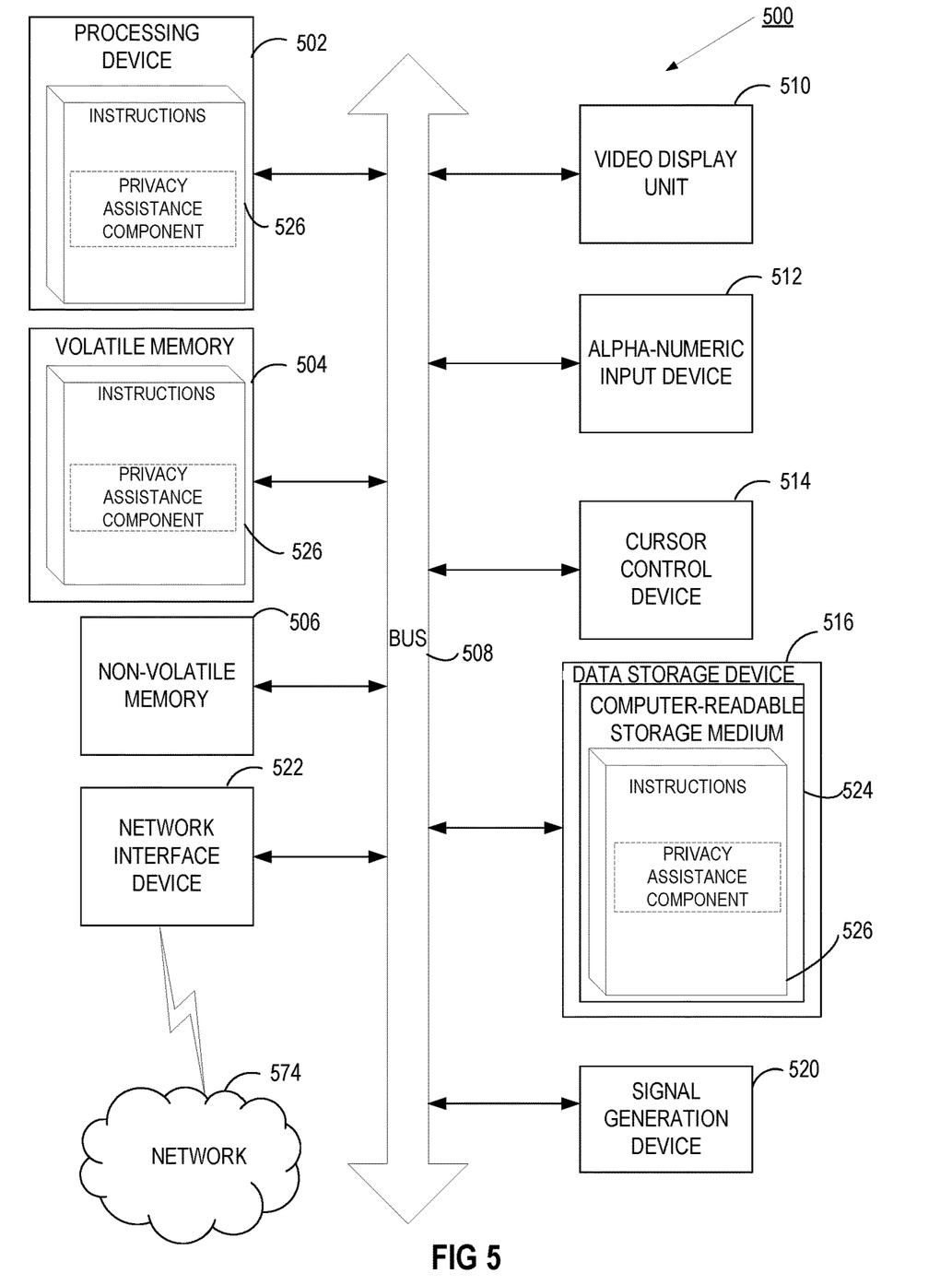
FIG. 5 depicts a block diagram of an illustrative computing system operating in accordance with the examples of the present disclosure.

FIG. 5 depicts a block diagram of an illustrative computing system 500 operating in accordance with the examples of the present disclosure. In various illustrative examples, computer system 500 may correspond to the computing device 110 of FIG. 1. In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., the non-persistent memory 124, such as random access memory (RAM)), a non-volatile memory 506 (e.g., the persistent memory 126, such as read-only memory (ROM) or electrically-erasable programmable ROM (EEPROM)), and a data storage device 516, which may communicate with each other via a bus 508. As discussed above, in some examples, while the non-persistent mode is activated for the client 112, the information related to a network connection (e.g., discovered SSIDs, random MAC address, authentication information) may be stored in the volatile memory 504 or may not be stored in any memory.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD, plasma, etc.), an alphanumeric input device 512 (e.g., a keyboard), a cursor control device 614 (e.g., a mouse), and a signal generation device 520.

Data storage device 516 may include a non-transitory computer-readable storage medium 524 on which may store instructions 526 encoding any one or more of the methods or functions described herein, including instructions for implementing methods 200 or 400 and for encoding privacy assistance component 122 and other components and modules illustrated in FIGS. 1 and 3.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "determining," "causing," "initiating," "updating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200 and/or 400 and each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   detecting, by an operating system component of a computing device, that a client requesting a network connection is operating in a non-persistent mode that prevents tracking of network locations accessed by the client;
   in response to the detecting that the client is operating in the non-persistent mode, performing, by a processing device executing the operating system component, privacy enhancing operations before establishing the network connection for the client, wherein the privacy enhancing operations comprise:
      broadcasting network messages to discover one or more available networks without using previously stored information related to the one or more available networks;
      receiving network identifying information from the one or more available networks;
      providing the network identifying information for the one or more available networks to the client;
      requesting the client to perform media access control (MAC) address randomization to override a saved configuration that previously disabled MAC address randomization;
      receiving, from the client, a random MAC address and authentication information for a connection to a network selected from the one or more available networks; and
      authenticating the client using the random MAC address and the authentication information; and
   causing, by the operating system component, the network connection between the client and the selected network to be established upon a successful authentication of the client.

2. The method of claim 1, wherein the privacy enhancing operations further comprise disabling automatic connection between the client and the one or more available networks using the previously stored information related to the one or more available networks and any previously stored information related to the client.

3. The method of claim 1, further comprising storing the network identifying information, the random MAC address, and the authentication information, in a non-persistent memory and erasing the network identifying information, the random MAC address, and the authentication information after authenticating the client.

4. The method of claim 1, wherein the client stores the network identifying information in a non-persistent memory while the non-persistent mode is activated.

5. The method of claim 4, wherein the non-persistent memory is erased in response to an event comprising one of:
   rebooting the client;
   deactivating the non-persistent mode of the client;
   locking an operating system;
   switching users of the operating system; or
   completing authentication of the client.

6. The method of claim 1, comprising, in response to a manual connection request from the client for manual connection to one of the one or more available networks that is identified as being previously stored, causing a prompt to display by the client requesting deactivation of the non-persistent mode.

7. The method of claim 1, wherein detecting, via the operating system component, that the client requesting the connection to the network is operating in the non-persistent mode comprises receiving an indication from the client in response to a user selection via the client to activate the non-persistent mode or in response to an application activating a second non-persistent mode.

8. The method of claim 1, wherein the privacy enhancing operations prevent traces of information revealing the client from being stored on the network device.

9. A system comprising:
   a non-persistent memory; and
   a processing device operatively coupled to the non-persistent memory, the processing device executing an operating system component to:
      detect that a client requesting a network connection is operating in a non-persistent mode that prevents tracking of network locations accessed by the client;
      in response to detecting that the client is operating in the non-persistent mode, perform privacy enhancing operations before establishing the network connection for the client, wherein the privacy enhancing operations comprise:
         broadcasting network messages to discover one or more available networks without using previously stored information related to the one or more available networks;
         receiving network identifying information from the one or more available networks;
         providing the network identifying information for the one or more available networks to the client;
         requesting the client to perform media access control (MAC) address randomization to override a saved configuration that previously disabled MAC address randomization;
         receiving, from the client, a random MAC address and authentication information for a connection to a network selected from the one or more available networks; and
         authenticating the client using the random MAC address and the authentication information; and
      cause the network connection between the client and the selected network to be established upon a successful authentication of the client.

10. The system of claim 9, wherein the privacy enhancing operations further comprise disabling automatic connection between the client and the one or more available networks using the previously stored information related to the one or more available networks and any previously stored information related to the client.

11. The system of claim 9, wherein the privacy enhancing operations further comprise storing the network identifying information, the random MAC address, and the authentication information, in the non-persistent memory.

12. The system of claim 9, wherein the client stores the network identifying information in the non-persistent memory while the non-persistent mode is activated.

13. The system of claim 12, wherein the non-persistent memory is erased in response to an event comprising one of:
rebooting the client;
deactivating the non-persistent mode of the client;
locking an operating system of the system;
switching users of the operating system; or
completing authentication of the client.

14. The system of claim 9, comprising a persistent memory, and, in response to a manual connection request from the client for manual connection to one of the one or more available networks that is identified as being previously stored in the persistent memory, the processing device is further to cause a prompt to display via the client requesting deactivation of the non-persistent mode.

15. The system of claim 9, wherein detecting that the client requesting the connection to the network is operating in the non-persistent mode comprises the processing device receiving an indication from the client in response to a user selection to activate the non-persistent mode or in response to an application activating a second non-persistent mode.

16. The system of claim 9, comprising a persistent memory, and wherein the privacy enhancing operations prevent traces of information revealing the client from being stored in the persistent memory.

17. A non-transitory machine-readable storage medium storing instructions that cause a processing device to:
detect that a client requesting a network connection is operating in a non-persistent mode that prevents tracking of network locations accessed by the client;
in response to detecting that the client is operating in the non-persistent mode:
broadcasting network messages to discover one or more available networks without using previously stored information related to the one or more available networks;
receiving network identifying information from the one or more available networks;
providing the network identifying information for the one or more available networks to the client;
authenticating the client using a MAC address of the client and authentication information of the client, wherein the MAC address is generated using MAC address randomization, wherein a request to perform the MAC address randomization overrides a saved configuration that previously disabled MAC address randomization; and
establishing a network connection between the client and the selected network upon a successful authentication of the client.

18. The non-transitory machine-readable storage medium of claim 17, wherein the processing device, in response to detecting that the client is operating in the non-persistent mode, is further to store the network identifying information, the MAC address, and the authentication information in a non-persistent memory coupled to the processing device.

19. The non-transitory machine-readable storage medium of claim 17, wherein the client stores the network identifying information in a non-persistent memory while the non-persistent mode is activated.

20. The non-transitory machine-readable storage medium of claim 17, wherein the MAC address of the client comprises a random MAC address that is generated by the client using MAC address randomization.

* * * * *